United States Patent
Rickard et al.

[15] 3,655,358
[45] Apr. 11, 1972

[54] STABILIZED LIQUID FERTILIZER COMPOSITION

[72] Inventors: Robert S. Rickard; Donald L. Whitfill, both of Ponca City, Okla.

[73] Assignee: Continental Oil Company, Ponca City, Okla.

[22] Filed: July 3, 1969

[21] Appl. No.: 839,083

[52] U.S. Cl. ................................71/34, 71/29, 71/35, 71/64 C
[51] Int. Cl. .................................................C05b 7/00
[58] Field of Search ...................71/29, 34, 35, 36, 64 C

[56] References Cited

UNITED STATES PATENTS

| | | | |
|---|---|---|---|
| 2,727,001 | 12/1955 | Rowe | 252/8.5 B |
| 2,950,961 | 8/1960 | Striplin et al. | 71/64 C |
| 3,290,140 | 12/1966 | Young | 71/34 |
| 3,459,499 | 8/1969 | Mullen | 71/34 X |

*Primary Examiner*—Reuben Friedman
*Assistant Examiner*—Bennett H. Levenson
*Attorney*—Joseph C. Kotarski, Henry H. Huth, William A. Mikesell, Jr. and Carroll Palmer

[57] ABSTRACT

A high-analysis suspension fertilizer is prepared by ammoniating phosphoric acid containing polyphosphoric acid to produce a supersaturated solution of ammonium phosphate containing ammonium polyphosphate, and comminuted chrysotile asbestos as a suspension aid. Additional plant nutrient salts may be blended into said saturated solution in forming the suspension product.

4 Claims, No Drawings

STABILIZED LIQUID FERTILIZER COMPOSITION

Chrysotile

This invention relates to an improved suspension fertilizer containing chrysotile asbestos, and to a method of manufacturing same.

The production and use of liquid fertilizers are rapidly increasing in most of the States of the Union because of the reduced cost of applying fertilizer of this type to soil. Since the fertilizer is fluid, it can be transferred by pumping through pipes and can be sprayed on the soil through nozzles, thereby reducing the amount of labor involved in the application. Other advantages that result from use of the liquid fertilizer include elimination of the cost of evaporating water to produce solid fertilizers and elimination of all difficulties due to segregation and caking. The latter disadvantages are associated with substantially all processes for the production of solid fertilizer.

A major disadvantage of liquid fertilizers as compared to solid products is that the solid products can be made in more concentrated form. The water used as solvent in making liquid fertilizers acts as a diluent and lowers the grade undesirably. It also adds to the shipping weight and increases transportation costs. The lower grade of solution-type fertilizers and their excess weight per unit of plant food become more disadvantageous from year to year as the general average analysis of solid fertilizers continually increases.

It is an object of this invention to provide a process for the manufacture of improved high-analysis fluid fertilizers which retain the advantage of fluid form while eliminating the disadvantage of low analysis.

Another object is to provide a process for the production of a stable suspension of one or more solid fertilizer salts in a saturated aqueous solution of the same salts.

Another object is to provide a process for the manufacture of substantially nonsettling suspensions of fertilizer salts having good flow properties and acceptable viscosity.

Still another object is to provide such process which may be operated either batchwise or continuously using equipment commonly present in existing fertilizer plants.

Another object is to provide improved, concentrated fluid fertilizers.

Fluid suspension fertilizers are known wherein a nucleating or suspension agent has been used to stabilize the product against settling. Among the agents which have been used are the various clays such as montmorillonite, bentonite, and attapulgite, and other minerals such as silica and alumina. Such agents are disclosed, for example, in U.S. Pat. No. 3,109,729 to Slack, et al., U.S. Pat. No. 3,113,858 to Slack, et al., U.S. Pat. No. 3,179,496 to Skinner, et al, and U.S. Pat. No. 3,234,004 to Smith et al. Of the various known suspension aids, attapulgite clay has been generally accepted as being the best.

We have now discovered that chrysotile asbestos is a superior suspension or nucleating aid in that less agent is needed than when using attapulgite clay, and the agent is more readily dispersed in the fluid fertilizer.

Chrysotile asbestos as used herein is understood to mean a naturally-occurring and well defined member of the asbestos group, and has a pronounced fibrous structure which is generally readily visible to the unaided eye, although sometimes inspection under a hand lens of 5 or 10 power is necessary to observe the fibrous structure. We prefer to use the asbestos in a comminuted state, most generally ground so as to pass a 100-mesh screen, although still finer grinding is in many cases useful. If dispersed with sufficient agitation, the initial grinding need not be as extensive. Chrysotile asbestos in the form of "shorts," too small for weaving purposes, is available from the asbestos cloth weaving industry. Other types of asbestos, such as actinolite, tremolite, etc., are generally not as suitable as suspension or nucleating agents as is the chrysotile species. The suspension or nucleating agent is used in quantity ranging from about 0.25 to 4.0 weight per cent, more preferably about 0.5 to 2.0 weight per cent based on the suspension product.

These products are prepared by forming a supersaturated solution of ammonium phosphate containing a small amount of a nucleating or suspension reagent. These supersaturated solutions also may contain such plant nutrient salts as ammonium nitrate, urea, potassium chloride as are required to give the fertilizer-nutrient ratio desired. Such salts are blended into the supersaturated solution of ammonium phosphate to form a suspension of plant nutrient solids therein. The water content of these solutions is controlled to give the amount necessary for the final plant-nutrient content required.

The presence of the nucleating or suspension agent causes excess fertilizer salts to crystallize from supersaturated solution in the form of very fine crystals, which remain suspended in a saturated solution of the same salts. The best suspensions are obtained when the amount of water is limited to such degree that at least one-third of the total plant nutrient will be in suspended phase. The reason for this is not clear. However, fertilizers of much better physical properties are obtained consistently when the suspended phase contains over one-third of the total plant nutrients as compared to suspensions in which only one-fourth of total plant nutrients are present as suspended solids.

Preferably, the supersaturated solution of ammonium phosphate is prepared by ammoniating strong phosphoric acid. The concentrated phosphoric acid used for ammoniation should be of sufficient strength that some polyphosphoric acid, viz. pyrophosphoric acid is present in it, and the result of the ammoniation is to produce the supersaturated solution of ammonium phosphate containing ammonium pyrophosphate therein. By a combination of these process steps, suspensions of high analysis, good flow properties, acceptable viscosity, and good stability are attained.

In preparing the suspensions, water may be added, as desired, to the neutralization vessel first, or it may be added concurrently with ammonia or with phosphoric acid. Also, either batch or continuous ammoniation may be employed. The nucleation or suspension agent preferably is added at a time such that it is present when the salts start crystallizing from solution in order that it may exert its full effect in causing rapid nucleation of the crystallizing salts with the result that very large numbers of very small, easily suspendible crystals are produced rather than a smaller number of large crystals. The nucleating or suspension agent, however, will have a beneficial effect even if it is added after the excess salts over and above the amount that will remain in solution have crystallized. During ambient changes in temperature, the salts alternately dissolve and re-crystallize. The presence of the nucleation agent prevents the recrystallizing salts from forming hard masses of crystals that would cause settling and segregation of the nutrient and interfere with application to the soil.

It is very desirable to have all the salts in solution at one stage of the process so that the nucleation agent can exert its full effect. This is accomplished most easily by adding the salts before ammoniation of the acid so that the heat of the neutralization reaction will raise the temperature of the mixture high enough to dissolve all salts. However, salts can be added during neutralization of the acid or even afterward, if added immediately before the neutralized solution has cooled. Addition before neutralization has the advantage that more of the heat of reaction goes to supply heat of solution for the salt rather than for evaporating water.

The phosphoric acid used may be any of the types available. However, the nucleation agent performs best when a part of the phosphate is present as pyrophosphoric acid. A preferred form of phosphoric acid for use in our process is acid which has been concentrated to a $P_2O_5$ content above that for 100 per cent orthophosphoric acid (72.4 per cent $P_2O_5$). At phosphoric acid strength above 72.4 per cent $P_2O_5$ a considerable proportion of pyrophosphoric acid is present. A convenient concentration for the phosphoric acid used is about 72 per cent $P_2O_5$. At this concentration the acid is fluid and relatively easy to handle, whereas at lower or higher concentrations the acid tends to crystallize at ambient temperatures. However, such concentrations can be used by keeping the acid at elevated temperature during handling and neutralization.

Merchant grade phosphoric acid, i.e., of a $P_2O_5$ content of about 50 to 55 weight per cent, especially as produced by the so-called wet process, can also be directly ammoniated, after concentrating the same pursuant to conventional practice for attaining polyphosphoric acid therein, to produce a base solution of supersaturated ammonium phosphate containing ammonium polyphosphate, said solution being suitable for producing a stable suspension fertilizer according to the present invention.

By use of these materials and process steps described above, a fluid fertilizer is produced which has good handling properties and a plant-food content much higher than the usual fertilizer solution. If these steps were not used, the excess salts would crystallize as heavy masses that would settle to the bottom or stick to the sides of containers and thereby make the product unusable.

The invention will now be described by reference to the following examples, which are illustrative and not limiting.

EXAMPLE I

The effect of chrysotile asbestos on the viscosity of a base solution of supersaturated ammonium phosphate containing ammonium polyphosphate, at various agent loadings was tested, and compared with attapulgite clay, by dividing the base solution into seven portions, adding the agent, and measuring viscosity. Results were as follows:

| Sample No. | Type Agent | Wt. % Agent | Initial Viscosity, cp.[1] | Viscosity After 18 Hours, cp.[1] |
|---|---|---|---|---|
| 1 | S-G210[2] | 0.5 | 150 | 250 |
| 2 | S-G210[2] | 1.0 | 750 | 800 |
| 3 | S-G210[2] | 1.5 | 1,500 | 1,500 |
| 4 | H.P.O.[3] | 0.5 | 500 | 550 |
| 5 | H.P.O.[3] | 1.0 | 2,250 | 2,150 |
| 6 | H.P.O.[3] | 1.5 | 4,500 | 4,350 |
| 7 | Minugel 200[4] | 3.0 | 375 | — |

[1] Brookfield viscosity, TA spindle, speed = 4

[2] Short-fiber refined chrysotile asbestos, Union Carbide

[3] High Purity Open chrysotile asbestos, Union Carbide

[4] Attapulgite clay, Floridin Company

EXAMPLE II

Chrysotile asbestos (H.P.O.) and attapulgite clay (Minugel 200) were evaluated as suspension agents in various N—P—K fertilizer grades as shown by measuring viscosity at room temperature after 24 hours' storage and at 32° F. Results were as follows:

| Sample No. | Wt. % Agent | Fertilizer Grade | Viscosity, cp.[1], room temp. | Viscosity, cp.[1], 32° F. |
|---|---|---|---|---|
| 1 | 0.3[2] | 7-21-21 | 1,350 | 1,500 |
| 2 | 0.3[2] | 7-21-14 | ≈150[4] | ≈150[4] |
| 3 | 0.6[2] | 7-21-21 | 3,500 | 4,000 |
| 4 | 0.6[2] | 7-21-14 | 600 | 600 |
| 5 | 0.9[2] | 7-21-21 | 7,400 | 8,450 |
| 6 | 0.09[2] | 7-21-14 | 1,450 | 1,500 |
| 7 | 1.8[3] | 7-21-21 | 1,750 | 1,100 |
| 8 | 1.8[3] | 7-21-14 | 150 | 25[5] |

[1] Brookfield viscosity, TA spindle, speed = 4

[2] H.P.O. chrysotile asbestos

[3] Minuget 200 clay

[4] Slight caking of the KCl

[5] Caking of the KCl

Having thus described the invention by providing specific examples thereof, it is to be understood that no undue limitations or restrictions are to be drawn by reason thereof and that many variations and modifications are within the scope of the invention.

What is claimed is:

1. A fertilizer composition comprising a suspension product of a supersaturated solution of ammonium phosphate containing ammonium pyrophosphate, said supersaturated solution also containing additional plant nutrient, and, as a suspension aid therefor, from about 0.25 to about 4.0 weight percent of comminuted chrysotile asbestos, based on the suspension product.

2. The method of producing a stable high analysis suspension-type fertilizer which comprises reacting ammonia and phosphoric acid of a concentration sufficient to contain polyphosphoric acid therein, to thereby produce a supersaturated solution of ammonium phosphate containing ammonium polyphosphate, admixing in the resulting solution comminuted chrysotile asbestos in an amount of about 0.25 to about 4.0 weight per cent based on the suspension product, and blending into said supersaturated solution plant nutrient salts in amount sufficient to form a suspension product of solids in said solution.

3. The method of claim 2, wherein said salts blended into the supersaturated solution are selected from the group consisting of ammonium nitrate, urea, potassium chloride, and mixtures thereof.

4. The method of claim 2 wherein said asbestos is present in amount between about 0.5 and about 2.0 weight percent based on the suspension product.

* * * * *